(12) United States Patent
Wachi

(10) Patent No.: US 11,715,016 B2
(45) Date of Patent: Aug. 1, 2023

(54) ADVERSARIAL INPUT GENERATION USING VARIATIONAL AUTOENCODER

(71) Applicant: INTERNATIONAL BUSINESS MACHINES CORPORATION, Armonk, NY (US)

(72) Inventor: Akifumi Wachi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 978 days.

(21) Appl. No.: 16/354,984

(22) Filed: Mar. 15, 2019

(65) Prior Publication Data

US 2020/0293901 A1    Sep. 17, 2020

(51) Int. Cl.
*G06N 3/08* (2023.01)
*G06N 3/04* (2023.01)
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC .... G06N 3/088; G06N 3/0454; G06N 3/0472; G06N 3/08
See application file for complete search history.

(56) References Cited

U.S. PATENT DOCUMENTS

| 10,824,909 | B2* | 11/2020 | Ros Sanchez | G06V 10/82 |
| 11,308,385 | B2* | 4/2022 | Abadi | G06N 3/084 |
| 2018/0365089 | A1 | 12/2018 | Okanohara et al. | |
| 2019/0012581 | A1 | 1/2019 | Honkala et al. | |
| 2019/0295302 | A1* | 9/2019 | Fu | G06N 3/088 |
| 2021/0073645 | A1* | 3/2021 | Kashiwagi | G06N 3/0472 |
| 2021/0241119 | A1* | 8/2021 | Takahashi | G06N 3/0454 |

OTHER PUBLICATIONS

Shi W, Huang L, Wang CD, Li JH, Tang Y, Fu C. Network embedding via community based variational autoencoder. IEEE Access. Feb. 21, 2019;7:25323-33. (Year: 2019).*

(Continued)

*Primary Examiner* — Oluwatosin O Alabi
(74) *Attorney, Agent, or Firm* — Tutunjian & Bitetto, P.C.; Randy Emilio Tejeda

(57) ABSTRACT

A computer-implemented method, computer program product, and computer processing system are provided for generating an adversarial input. The method includes reducing, by a Conditional Variational Encoder, a dimensionality of each of inputs to a target algorithm to obtain a set of latent variables. The method further includes separately training, by a processor, (i) a successful predictor with a first subset of the latent variables as a first input for which the target algorithm succeeds and (ii) an unsuccessful predictor with a second subset of the latent variables as a second input for which the target algorithm fails. Both the successful and the unsuccessful predictors predict outputs of the target algorithm. The method also includes sampling, by the processor, an input that is likely to make the target algorithm fail as the adversarial input by using a likelihood of the successful predictor and the unsuccessful predictor.

18 Claims, 7 Drawing Sheets

(56) References Cited

OTHER PUBLICATIONS

Akcay S, Atapour-Abarghouei A, Breckon TP. Ganomaly: Semi-supervised anomaly detection via adversarial training. In Asian conference on computer vision Dec. 2, 2018 (pp. 622-637). Springer, Cham. (Year: 2018).*

Yang Y, Zheng K, Wu C, Yang Y. Improving the classification effectiveness of intrusion detection by using improved conditional variational autoencoder and deep neural network. Sensors. Jan. 2019;19(11):2528. (Year: 2019).*

Pagnoni A, Liu K, Li S. Conditional variational autoencoder for neural machine translation. arXiv preprint arXiv:1812.04405. Dec. 11, 2018. (Year: 2018).*

Alqahtani H, Kavakli-Thorne M, Kumar G. Applications of generative adversarial networks (gans): An updated review. Archives of Computational Methods in Engineering. Dec. 19, 2019:1-28. (Year: 2019).*

Ashok et al., "Fooling a Deep Neural Network Forever", Carnegie Mellon University, 2018, pp. 1-4.

Godefroid et al., "Learn&Fuzz: Machine Learning for Input Fuzzing", arXiv:1701.07232v1 [cs.AI] Jan. 25, 2017, pp. 1-18.

Goodfellow et al., "Explaining and Harnessing Adversarial Examples", arXiv:1412.6572v3 [stat.ML] Mar. 20, 2015, pp. 1-11.

Kos et al., "Adversarial Examples for Generative Models", Workshop track—ICLR 2017, Apr. 2017, pp. 1-6.

Papemot et al., "The Limitations of Deep Learning in Adversarial Settings", arXiv:1511.07528v1 [cs.CR] Nov. 24, 2015, 16 pages.

Szegedy et al., "Intriguing properties of neural networks", arXiv:1312.6199v4 [cs.CV] Feb. 19, 2014, pp. 1-10.

Takanen et al., "Fuzzing for Software Security Testing and Quality Assurance", Information Security and Privat Series, Artech House, 2008, 312 pages.

Xie et al., "Coverage-Guided Fuzzing for Deep Neural Networks", arXiv:1809.01266v2 [cs.SE] Sep. 7, 2018, pp. 1-25.

* cited by examiner

ADVERSARIAL INPUT GENERATION USING VARIATIONAL AUTOENCODER

BACKGROUND

The present invention generally relates to machine learning, and more particularly to adversarial input generation using a variational autoencoder.

In safety critical systems, the designers intent is to provide software that does not fail under all circumstances. Hence, software engineers identify the fail cases, and then modify the software not to fail.

However, such an approach is not without deficiencies. For example, all the software under development has some fail cases that need to be found. Moreover, the more sophisticated the software becomes, the more difficult it becomes to find the fail cases. While fail cases can be found by randomly running experiments, such an approach is burdensome and overly time-consuming. Hence, there is a need for an improved approach for input generation to detect fail cases.

SUMMARY

According to an aspect of the present invention, a computer-implemented method is provided for generating an adversarial input. The method includes reducing, by a Conditional Variational Encoder, a dimensionality of each of inputs to a target algorithm to obtain a set of latent variables. The method further includes separately training, by a processor, (i) a successful predictor with a first subset of the latent variables as a first input for which the target algorithm succeeds and (ii) an unsuccessful predictor with a second subset of the latent variables as a second input for which the target algorithm fails. Both the successful and the unsuccessful predictors predict outputs of the target algorithm. The method also includes sampling, by the processor, an input that is likely to make the target algorithm fail as the adversarial input by using a likelihood of the successful predictor and the unsuccessful predictor.

According to another aspect of the present invention, a computer program product is provided for generating an adversarial input. The computer program product includes a non-transitory computer readable storage medium having program instructions embodied therewith. The program instructions are executable by a computer to cause the computer to perform a method. The method includes reducing, by a Conditional Variational Encoder of the computer, a dimensionality of each of inputs to a target algorithm to obtain a set of latent variables. The method further includes separately training, by a processor of the computer, (i) a successful predictor with a first subset of the latent variables as a first input for which the target algorithm succeeds and (ii) an unsuccessful predictor with a second subset of the latent variables as a second input for which the target algorithm fails. Both the successful and the unsuccessful predictors predict outputs of the target algorithm. The method also includes sampling, by the processor, an input that is likely to make the target algorithm fail as the adversarial input by using a likelihood of the successful predictor and the unsuccessful predictor.

According to yet another aspect of the present invention, a computer processing system is provided for generating an adversarial input. The computer processing system includes a memory for storing program code. The computer processing system further includes a processor for running the program code to reduce, using a Conditional Variational Encoder, a dimensionality of each of inputs to a target algorithm to obtain a set of latent variables. The processor further runs the program code to separately train (i) a successful predictor with a first subset of the latent variables as a first input for which the target algorithm succeeds and (ii) an unsuccessful predictor with a second subset of the latent variables as a second input for which the target algorithm fails. Both the successful and the unsuccessful predictors predict outputs of the target algorithm. The processor also runs the program code to sample an input that is likely to make the target algorithm fail as the adversarial input by using a likelihood of the successful predictor and the unsuccessful predictor.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to adversarial input generation using a variational autoencoder.

In an embodiment, the dimension of an input x is reduced by a Conditional Variational Autoencoder (CVAE) and then new inputs are created that are likely to make a tested algorithm f fail.

In an embodiment, the present invention trains two neural networks. By separately training two neural networks to (1) correctly predict the output from the latent space (successful predictor) and (2) mistakenly predict the output from the latent space (unsuccessful predictor), the present invention is able to deal with the imbalanced data. To that end, the present invention efficiently samples an input that is likely to make a tested algorithm f fail by leveraging the likelihood of the successful predictor and the unsuccessful predictor.

Figure 1:
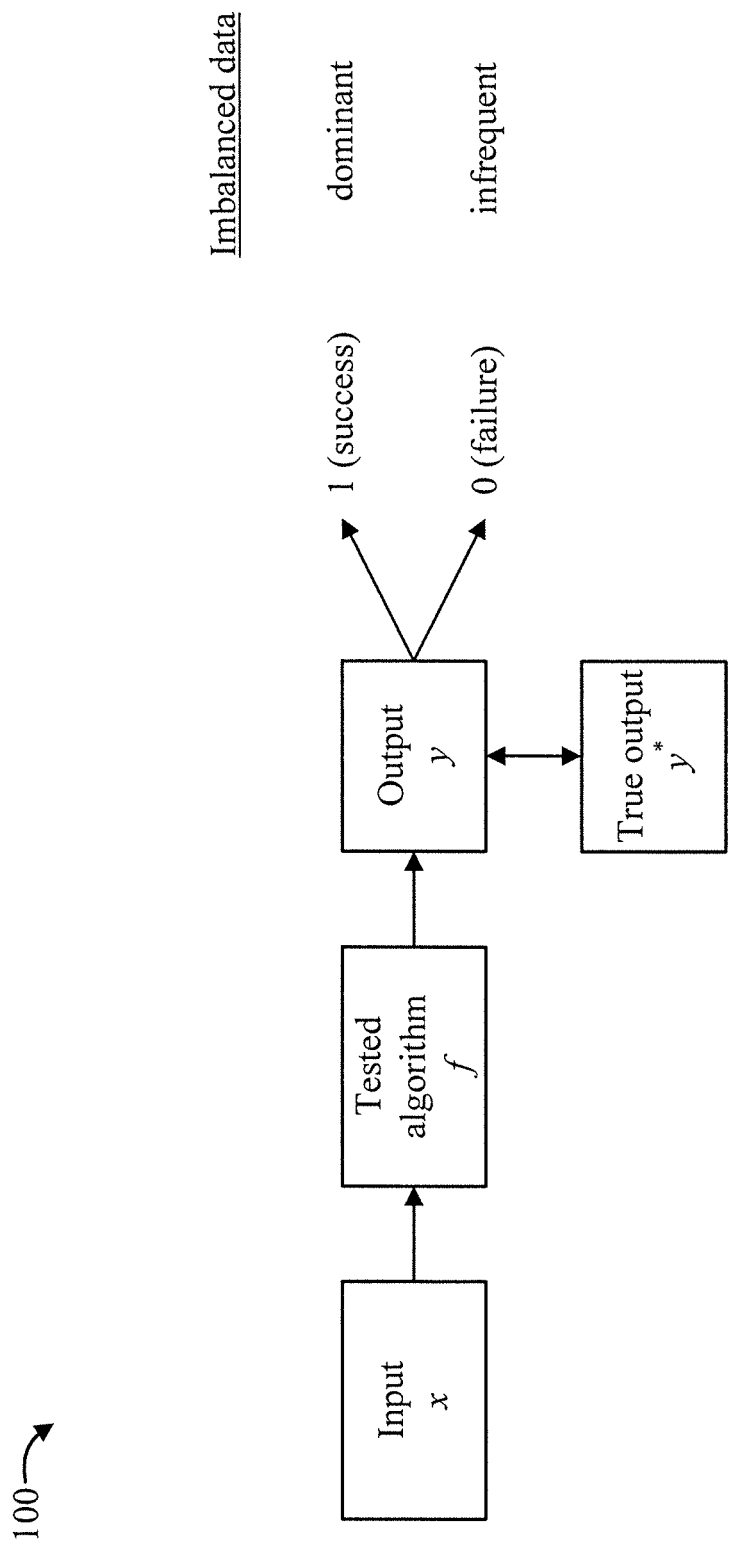
FIG. 1 is a block diagram showing an input x and predicted output y of a tested algorithm f, and a true output y* of the tested algorithm f, in accordance with an embodiment of the present invention.

FIG. 1 is a block diagram showing an input x and predicted output y of a tested algorithm f, as well as a true output y* of the tested algorithm f, in accordance with an embodiment of the present invention.

As shown, the predicted output y can take on a value of 1 indicative of success or a value of 0 indicative of failure. The values of 1 are dominant, while the values of 0 are infrequent, in the imbalanced data of y. The present invention leverages the likelihood of the successful predictor and the unsuccessful predictor.

Some of the myriad of applications to which the present invention can be applied include, but are not limited to, for example, autonomous driving, onboard control systems, robotic manipulation, robotics perception, machine assembly, and so forth. These and other applications to which the present invention can be applied are readily determined by one of ordinary skill in the art given the teachings of the present invention provided herein, while maintaining the spirit of the present invention.

Figure 2:
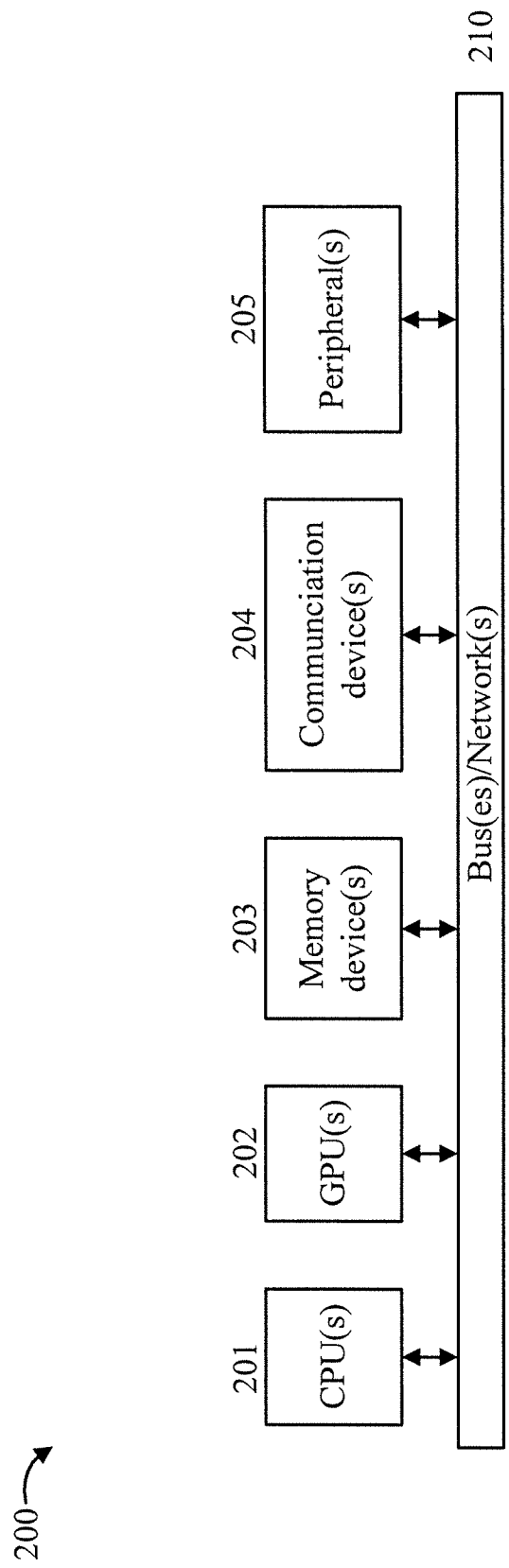
FIG. 2 is a block diagram showing an exemplary processing system to which the present invention may be applied, in accordance with an embodiment of the present invention.

FIG. 2 is a block diagram showing an exemplary processing system 200 to which the present invention may be applied, in accordance with an embodiment of the present invention. The processing system 200 includes a set of processing units (e.g., CPUs) 201, a set of GPUs 202, a set of memory devices 203, a set of communication devices 204, and set of peripherals 205. The CPUs 201 can be single or multi-core CPUs. The GPUs 202 can be single or multi-core GPUs. The one or more memory devices 203 can include caches, RAMs, ROMs, and other memories (flash, optical, magnetic, etc.). The communication devices 204 can include wireless and/or wired communication devices (e.g., network (e.g., WIFI, etc.) adapters, etc.). The peripherals 205 can include a display device, a user input device, a printer, an imaging device, and so forth. Elements of processing system 200 are connected by one or more buses or networks (collectively denoted by the figure reference numeral 210).

In an embodiment, memory devices 203 can store specially programmed software modules in order to transform the computer processing system into a special purpose computer configured to implement various aspects of the present invention. In an embodiment, special purpose hardware (e.g., Application Specific Integrated Circuits (ASICs), and so forth) can be used to implement various aspects of the present invention. Moreover, in an embodiment, a VAE is formed from at least one of the memory devices 203 and at least one of the processing elements 201 and/or 202. Further, in an embodiment, a special purpose hardware (e.g., ASIC, etc.) is used to implement a VAE.

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 6-7). These and other variations of the processing system 200 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 200.

An autoencoder, as used by the present invention, is a type of neural network. In general, an autoencoder is used to learn a representation (encoding) for a set of data, typically for dimensionality reduction, by training the network to, for example, ignore signal "noise." Along with the reduction side, a reconstructing side is learnt, where the autoencoder tries to generate from the reduced encoding a representation as close as possible to its original input, hence its name.

An autoencoder learns to compress data from the input layer into a short code, and then uncompress that code into something that closely matches the original data. This forces the autoencoder to engage in dimensionality reduction, for example, by learning how to ignore noise. Some architectures use stacked sparse autoencoder layers for image recognition. The first encoding layer might learn to encode easy features like corners, the second encoding layer might analyze the first layer's output and then encode less local features like the tip of a nose, the third encoding layer might encode a whole nose, and so forth, until the final encoding layer encodes the whole image into a code that matches (for example) the concept of "person". The decoding layers will learn to decode the learnt code representation back into its original form as close as possible. An alternative use is as a generative model: for example, if a system is manually fed the codes it has learned for "person" and "flying", it may attempt to generate an image of a flying person, even if it has never seen a flying person before. These and other aspects of the VAE are exploited by various embodiments of the present invention.

In an embodiment, a method in accordance with the present invention proposes to craft adversarial inputs for (1) a Neural Network (NN) and (2) a rule-based algorithm based on the imbalanced data.

As training data, the following can be used: (1) the inputs x of the tested algorithm, (2) the predicted outputs y of the tested algorithm, and (3) the true outputs y*.

Figure 3:
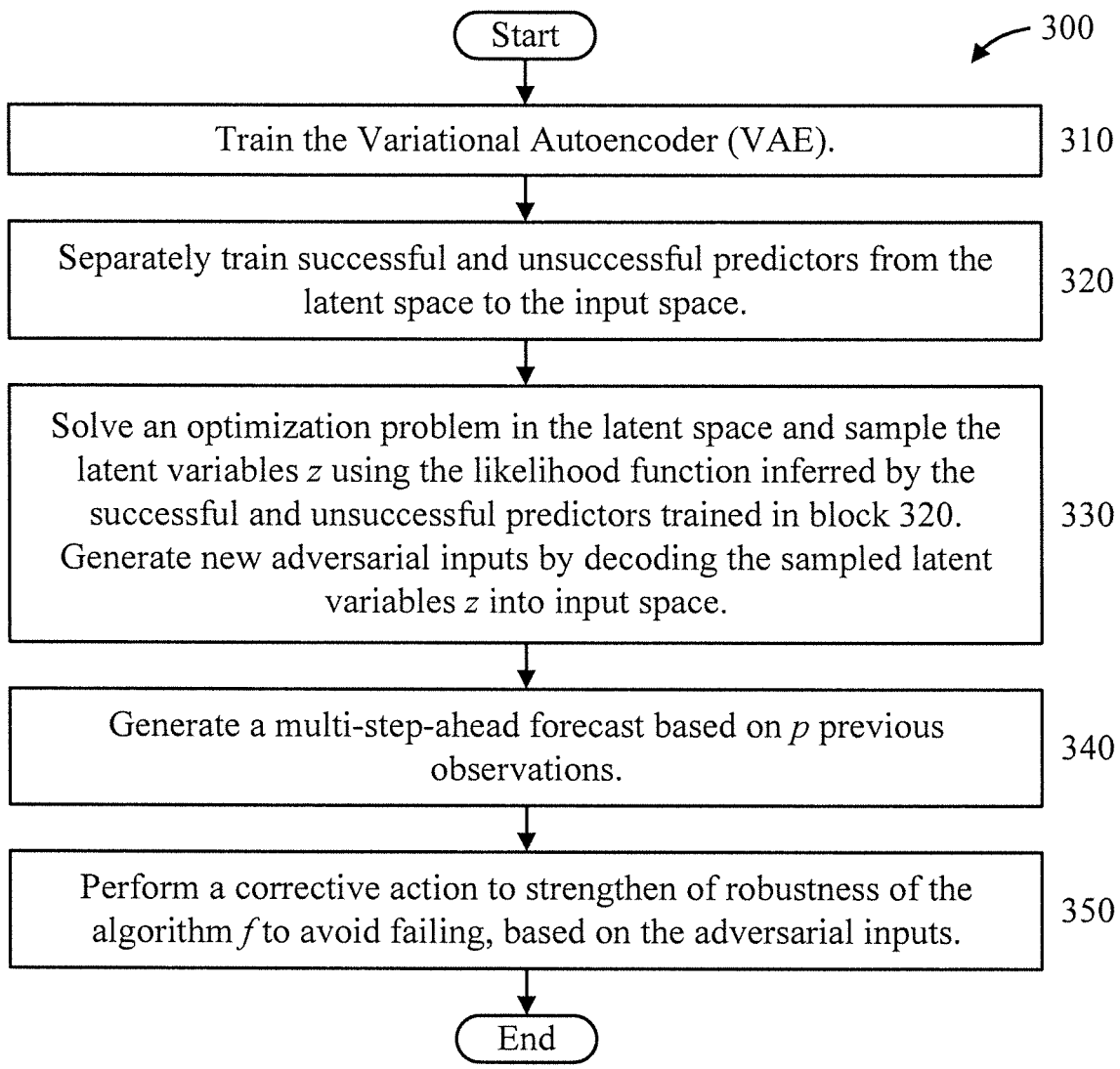
FIG. 3 is a flow diagram showing an exemplary method for generating adversarial inputs using a variational autoencoder, in accordance with an embodiment of the present invention.
Figure 4:
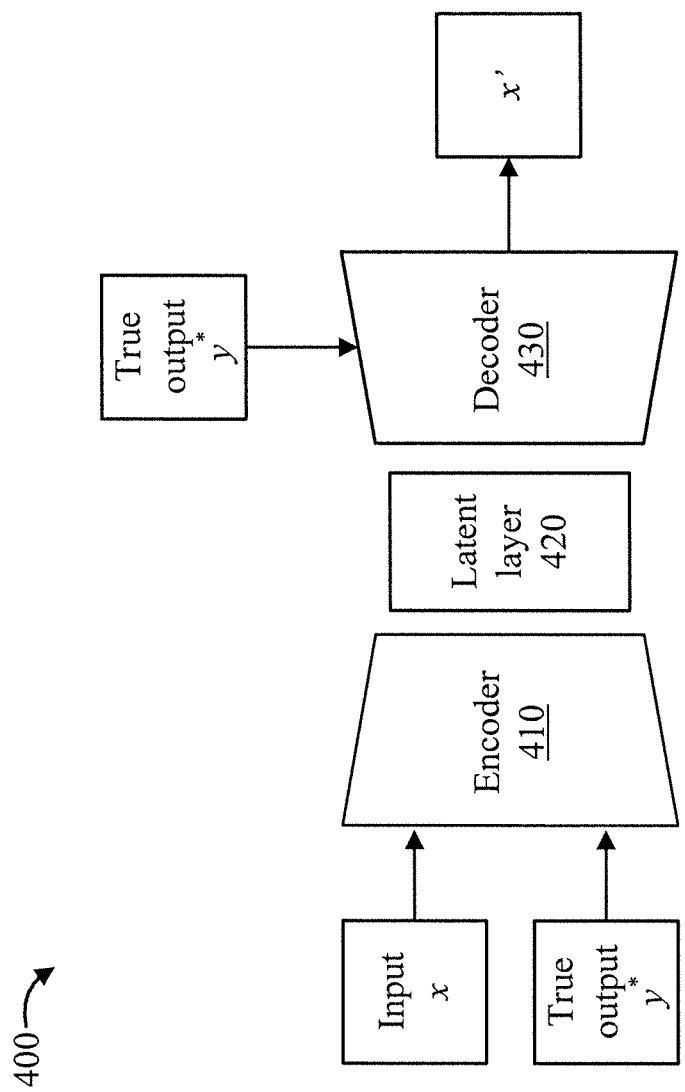
FIG. 4 is a block diagram graphically showing a block of the method of FIG. 3, in accordance with an embodiment of the present invention.
Figure 5:
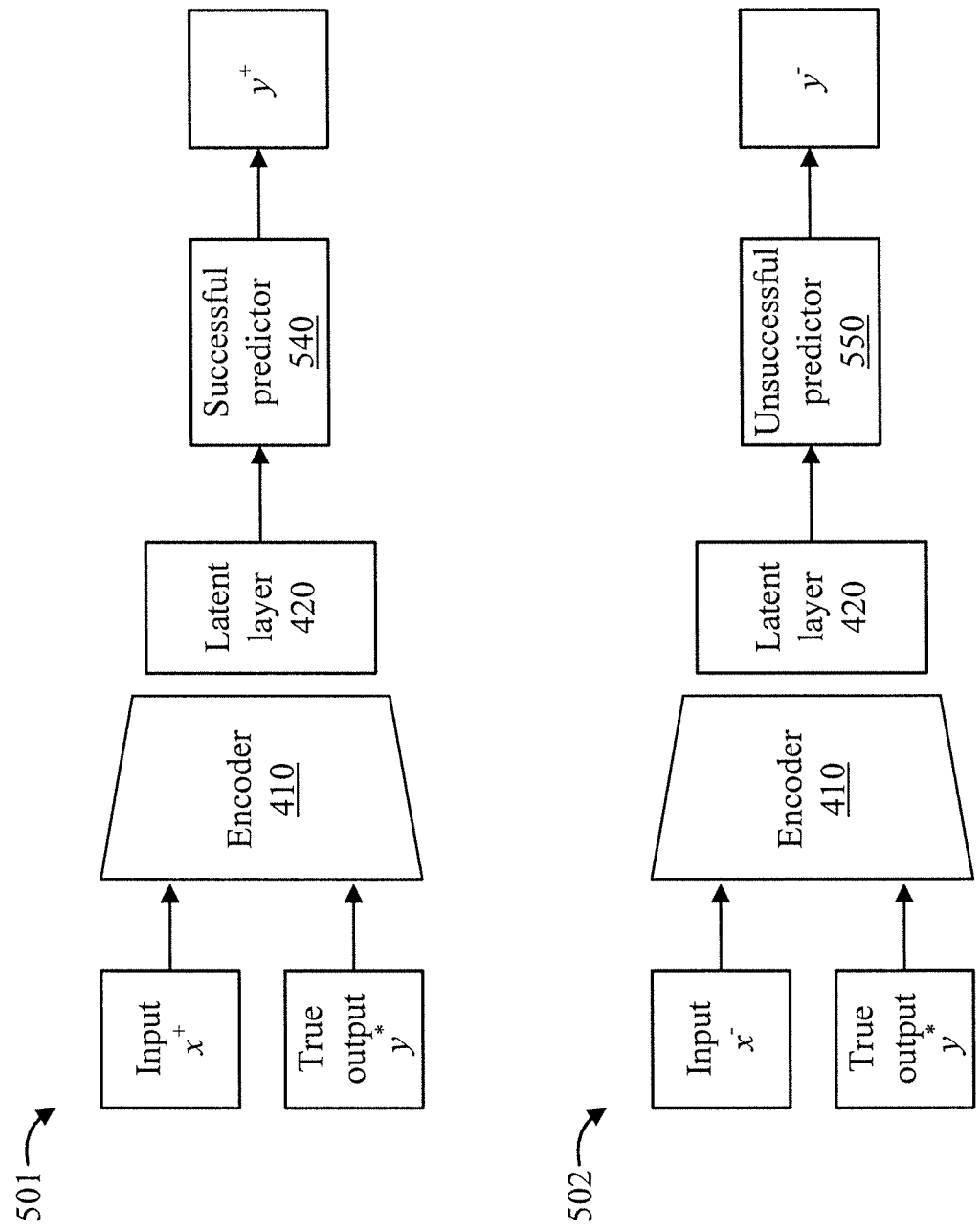
FIG. 5 is a block diagram graphically showing another block of the method of FIG. 3, in accordance with an embodiment of the present invention.

FIG. 3 is a flow diagram showing an exemplary method 300 for generating adversarial inputs using a variational autoencoder, in accordance with an embodiment of the present invention. Method 300 includes blocks 310, 320, 330, and 340. FIG. 4 is a block diagram graphically showing block 310 of the method 300 of FIG. 3, in accordance with an embodiment of the present invention. FIG. 5 is a block diagram graphically showing block 320 of the method 300 of FIG. 3, in accordance with an embodiment of the present invention.

At block 310, train the Variational Autoencoder (VAE). By training the VAE, a trained encoder 410 (from input space 401 to latent space 420) and trained decoder 430 (from latent space 420 to input space 401) can be obtained. The input 401 of the CVAE is the input of the tested algorithm. In using the CVAE, the true output y* is additionally used as an input. The output y* of the CVAE is the true output y*. The decoder 430 thus reduces the dimensionality of input x as well as generates new input x'.

At block 320, separately train a successful 540 predictor and an unsuccessful predictor 550 from the latent space to the input space using a first (succeeding) training sequence 501 and a second (failing) training sequence 502. By separately training the two predictors, the issue of imbalanced data is addressed.

Hence, for the successful predictor 540:

Inputs (for which f succeeds): latent variables z obtained by encoding the inputs for which the tested algorithm succeeds.

Output: output of the tested algorithm (=true output y*).

Thus, as shown in FIG. 5, the encoder 410 trained in block 310 receives inputs for which f succeeds, namely $x^+$ and y*, in order to determine the latent layer 420. The successful predictor 540 will provide the true output of algorithm f.

Hence, for the unsuccessful predictor 550:

Input (for which f fails): latent variables z obtained by encoding the inputs for which the tested algorithm fails.

Output: output of the tested algorithm (≠true output y*).

Thus, as shown in FIG. 5, the encoder 410 trained in block 310 receives inputs for which f fails, namely $x^-$ and y*, in order to determine the latent layer 420. The unsuccessful predictor 550 will provide an untrue output $y^-$ of algorithm f.

At block 330, solve an optimization problem in the latent space and sample the latent variables z using the likelihood function inferred by the successful and unsuccessful predictors trained in block 320. Generate new adversarial inputs by decoding the sampled latent variables z into input space. The sampled latent variable z is mapped to the input space. This mapping is executed by the trained decoder of the VAE. The dimension of the latent vectors is much lower than that of the input vectors. Hence, the decoder is used to decode the adversarial latent vector.

In an embodiment, block 330 can involve case 1, case 2, or case 3. Cases 2 and 3 represent particular implementations of the present invention. In the cases, variables can be defined as follows:

z: latent variable.

$t^+$: the target for a successful predictor.

$t^-$: the target for an unsuccessful predictor.

h: threshold.

Case 1 corresponds to controlling what and for what f mistakes, as follows:

$$\max_z f(z, t^+, t^-) = -\log\ p(y^+ = t^+ \mid z) + \log\ p(y^- = t^- \mid z) + \log\ \mathcal{N}(z \mid 0, I).$$

Thus, case 1 can pertain to, for example, adversarial inputs to make algorithm f mistakenly recognize a cat as a dog. The preceding is merely one illustrative example of a myriad of possibilities, as readily appreciated by one of ordinary skill in the art, given the teachings of the present invention provided herein.

Case 2 corresponds to controlling what f mistakes, as follows:

$$\max_z f(z, t^+, t^-) = -\log\ p(y^+ = t^+ \mid z) + \log\ \mathcal{N}(z \mid 0, I); \text{ and}$$

$$\text{s.t.: } \log\ p(y^+ = t^+ \mid z) \geq h.$$

Thus, case 2 can pertain to, for example, adversarial inputs such that the algorithm mistakenly recognizes something else even though the true is a cat. The preceding is merely one illustrative example of a myriad of possibilities, as readily appreciated by one of ordinary skill in the art, given the teachings of the present invention provided herein.

Case 3 corresponds to simply enhancing the possibility that the algorithm will fail, as follows:

$$\max_{z, t^+, t^-} f(z, t^+, t^-) =$$
$$-\log\ p(y^+ = t^+ \mid z) + \log\ p(y^- = t^- \mid z) + \log\ \mathcal{N}(z \mid 0, I); \text{ and}$$

$$\text{s.t.: } \log\ p(y^+ = t^+ \mid z) \geq h.$$

Thus, case 3 can pertain to, for example, adversarial inputs such that the algorithm mistakenly recognizes something as something else. The preceding is merely one illustrative example of a myriad of possibilities, as readily appreciated by one of ordinary skill in the art, given the teachings of the present invention provided herein.

At block 340, perform a corrective action to strengthen of robustness of the algorithm f to avoid failing, based on the adversarial inputs. Hence, the code of algorithm f can be modified to overcome a situation (e.g., bad code) causing failure, based on the adversarial inputs.

Thus, method 300 advantageously and efficiently creates new inputs that make an algorithm fail with high probability, which contributes to the construction of a correct and robust algorithm.

Intuitively, the tested algorithm is likely to fail if (1) a successful predictor has a small confidence and then (2) the unsuccessful predictor has much confidence. On the other hand, when the successful predictor has too little confidence, it means that is it hopelessly difficult to predict the true output correctly.

The present invention can be applied to various types of algorithms under test including, for example, but not limited to, computer vision, robotic, and rule-based systems. Also, the present invention can efficiently generate new inputs that are likely to make the tested algorithm fail, with such generation being performed from imbalanced data as described herein. Moreover, the present invention can deal with high-dimensional inputs due to the dimension reduction resulting from the use of the VAE. These and other advantages and features of the present invention are readily determined by one of ordinary skill in the art given the teachings of the present invention provided herein, while maintaining the spirit of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
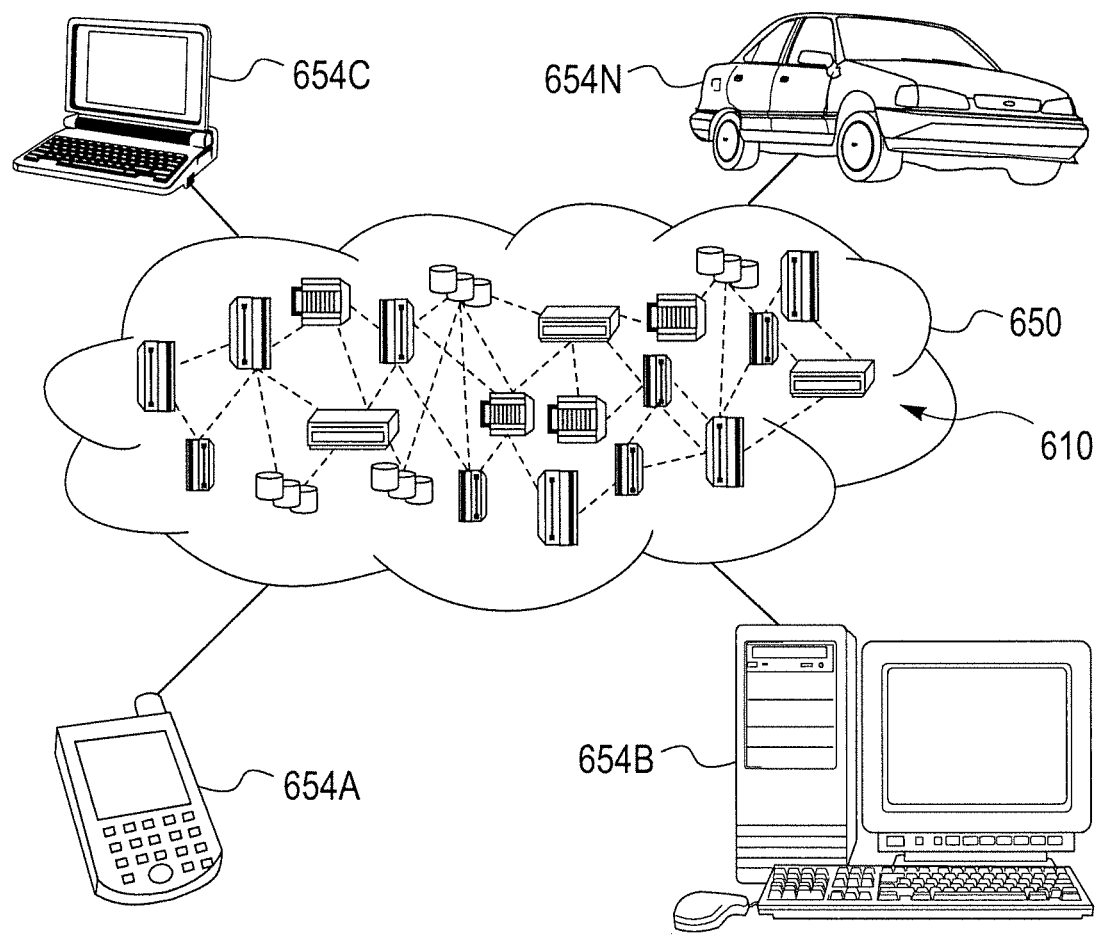
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
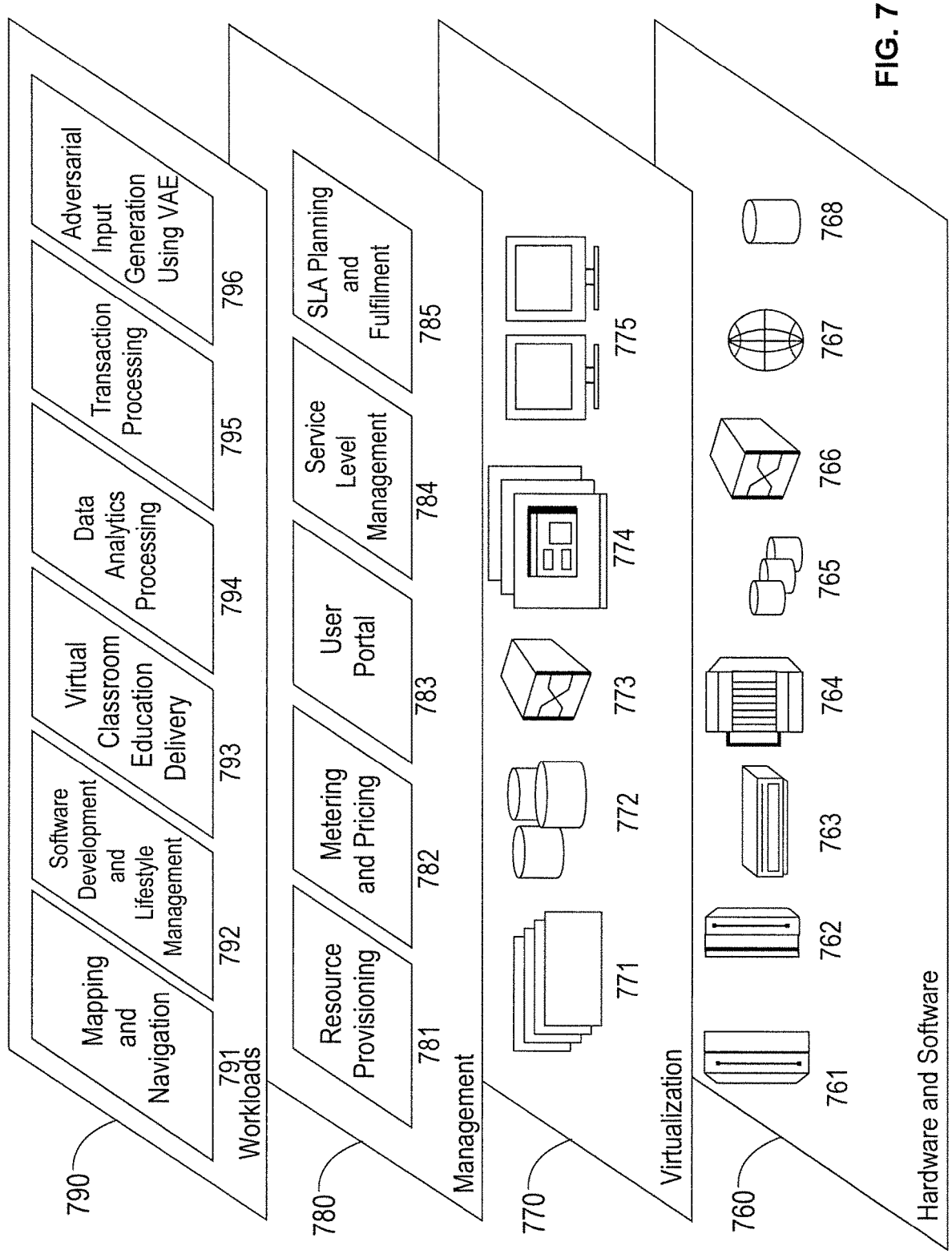
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and adversarial input generation using Variational Autoencoder (VAE) 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for generating an adversarial input, comprising:
   reducing, by a Conditional Variational Encoder, a dimensionality of each of inputs to a target algorithm to obtain a set of latent variables;
   separately training, by a processor, (i) a successful predictor with a first subset of the latent variables as a first input for which the target algorithm succeeds using a first succeeding training sequence and (ii) an unsuccessful predictor with a second subset of the latent variables as a second input for which the target algorithm fails using a second failing training sequence, both the successful and the unsuccessful predictors predicting externally available outputs of the target algorithm, and the first succeeding training sequence and the second failing training sequence having a common input and further having an uncommon input as the first subset of the latent variables and the second subset of the latent variables with respect to each other; and
   sampling, by the processor, an input that is likely to make the target algorithm fail as the adversarial input by using a likelihood of the successful predictor and the unsuccessful predictor.

2. The computer-implemented method of claim 1, wherein the input that is likely to make the target algorithm fail is sampled from the first input and the second input.

3. The computer-implemented method of claim 1, wherein the likelihood is represented by a likelihood function inferred by the successful predictor and the unsuccessful predictor.

4. The computer-implemented method of claim 3, wherein the likelihood function includes a log component for a target of the successful predictor and anther log component for a target of the unsuccessful predictor.

5. The computer-implemented method of claim 1, further comprising selectively representing the likelihood by one of a plurality of likelihood functions.

6. The computer-implemented method of claim 1, further comprising modifying the target algorithm to overcome a particular fail condition implicated by the sampled input.

7. The computer-implemented method of claim 1, wherein the successful predictor is trained from a latent space to an input space, the latent space corresponding to the first subset of the latent variables, and the input space corresponding to the first input and the second input.

8. The computer-implemented method of claim 1, wherein the sampled input has a likelihood of failing above a threshold likelihood value.

9. A computer program product for generating an adversarial input, the computer program product comprising a non-transitory computer readable storage medium having program instructions embodied therewith, the program instructions executable by a computer to cause the computer to perform a method comprising:
   reducing, by a Conditional Variational Encoder of the computer, a dimensionality of each of inputs to a target algorithm to obtain a set of latent variables;
   separately training, by a processor of the computer, (i) a successful predictor with a first subset of the latent variables as a first input for which the target algorithm succeeds using a first succeeding training sequence and (ii) an unsuccessful predictor with a second subset of the latent variables as a second input for which the target algorithm fails using a second failing training sequence, both the successful and the unsuccessful predictors predicting externally available outputs of the target algorithm, and the first succeeding training sequence and the second failing training sequence having a common input and further having an uncommon input as the first subset of the latent variables and the second subset of the latent variables with respect to each other; and
   sampling, by the processor, an input that is likely to make the target algorithm fail as the adversarial input by using a likelihood of the successful predictor and the unsuccessful predictor.

10. The computer program product of claim 9, wherein the input that is likely to make the target algorithm fail is sampled from the first input and the second input.

11. The computer program product of claim 9, wherein the likelihood is represented by a likelihood function inferred by the successful predictor and the unsuccessful predictor.

12. The computer program product of claim 11, wherein the likelihood function includes a log component for a target of the successful predictor and anther log component for a target of the unsuccessful predictor.

13. The computer program product of claim 9, further comprising selectively representing the likelihood by one of a plurality of likelihood functions.

14. The computer program product of claim 9, further comprising modifying the target algorithm to overcome a particular fail condition implicated by the sampled input.

15. The computer program product of claim 9, wherein the successful predictor is trained from a latent space to an input space, the latent space corresponding to the first subset of the latent variables, and the input space corresponding to the first input and the second input.

16. The computer program product of claim 9, wherein the sampled input has a likelihood of failing above a threshold likelihood value.

17. A computer processing system for generating an adversarial input, comprising:
   a memory for storing program code; and
   a processor for running the program code to
      reduce, using a Conditional Variational Encoder, a dimensionality of each of inputs to a target algorithm to obtain a set of latent variables;
      separately train (i) a successful predictor with a first subset of the latent variables as a first input for which the target algorithm succeeds using a first succeeding training sequence and (ii) an unsuccessful predictor with a second subset of the latent variables as a second input for which the target algorithm fails using a second failing training sequence, both the successful and the unsuccessful predictors predicting externally available outputs of the target algorithm, and the first succeeding training sequence and the second failing training sequence having a common input and further having an uncommon input as the first subset of the latent variables and the second subset of the latent variables with respect to each other; and
      sample an input that is likely to make the target algorithm fail as the adversarial input by using a likelihood of the successful predictor and the unsuccessful predictor.

18. The computer processing system of claim 17, wherein the likelihood is represented by a likelihood function inferred by the successful predictor and the unsuccessful predictor.

* * * * *